Aug. 8, 1939.  A. S. FITZ GERALD  2,168,402

PULSATING ELECTRICAL CONTROL SYSTEM

Filed Jan. 11, 1938   2 Sheets-Sheet 1

INVENTOR
Alan S. FitzGerald

INVENTOR
Alan S FitzGerald

Patented Aug. 8, 1939

2,168,402

UNITED STATES PATENT OFFICE 2,168,402

PULSATING ELECTRICAL CONTROL SYSTEM

Alan S. Fitz Gerald, Wynnewood, Pa.

Application January 11, 1938, Serial No. 184,370

18 Claims. (Cl. 172—281)

This invention relates to electrical control systems and circuits which include saturating reactors, such as, for example, apparatus of the general type I have described in U. S. Patent No. 2,027,312.

In general my invention provides circuit arrangements similar to those described in the above cited patent for furnishing a source of low frequency electrical pulsations.

Figures 1, 2, 6:
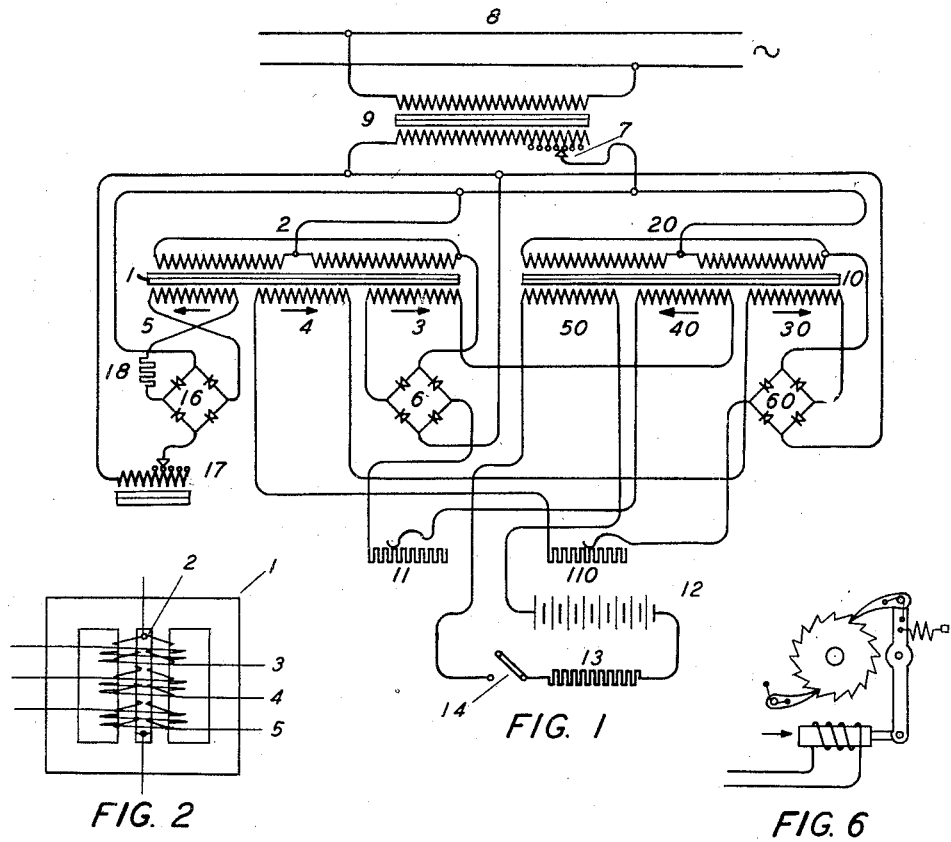
Fig. 1 is an electrical circuit diagram representing an embodiment of my invention.
Fig. 2 is a diagram representing one form of construction of a saturating reactor which may be used in carrying my invention into effect.
Fig. 6 illustrates an application of my invention.

Referring now more particularly to Fig. 1 of the drawings, there is illustrated an electric circuit comprising exclusively stationary apparatus which may have neither contacts, moving parts, condensers, nor electron discharge devices, and which, when energized with alternating current of a given frequency provides electrical pulsations of a lower frequency.

U. S. Patent No. 2,027,312 describes a circuit comprising a saturating reactor, which has two stable states, one giving a relatively low current and another giving a substantially higher value of current.

The arrangement which I show in Fig. 1 of the present specification comprises two duplicate circuits of the type shown in Patent No. 2,027,312, inter-connected so as to cause sustained oscillation or pulsation. That is to say, when the first of these circuits changes from one state of stability to another the resulting change in current value, applied to the second circuit causes a change of state in this last circuit. Connections from the second circuit back to the first circuit cause the change of current value in the second circuit to react upon the first circuit so as to restore the first circuit to its original condition. It is apparent that this chain of causation will result in continued pulsation.

In Fig. 1 I show a first saturating reactor having a core 1, an alternating current or impedance winding 2, and three direct current saturating windings 3, 4, and 5. The structural configuration of the core 1 and the disposition thereon of the several windings may be in accordance with any of the several well-known types of saturating reactors of the prior art, although I have illustrated in Fig. 2 the general proportions of the core 1, together with the arrangement thereon of the windings, which I have found to be particularly satisfactory for the practicing of my invention.

As shown in the figures, the alternating or impedance winding 2 comprises two sections connected in parallel and arranged on adjacent limbs of the core 1. The parallel-connected sections of winding 2 are energized from the supply circuit 8 through transformer 9, having a tap-switch 7.

I show also in Fig. 1 a duplicate saturating reactor having a core 10, impedance winding 20 and direct current windings 30, 40 and 50, which may all be similar to the corresponding windings of the first saturating reactor.

The saturating winding 3 of the core 1 is energized with a uni-directional current variable in accordance with the current in the winding 2, as by means of a full wave rectifier 6, the alternating current side of which is connected to the winding 2. In series with the winding 3 the output of the rectifier 6 energizes also the winding 40 on the second saturating reactor. The output circuit of the rectifier 6 includes also a resistance 11. Similar connections are made in respect of the alternating current winding 20, direct current windings 30 and 4, rectifier 60, and resistance 110. As indicated by the arrows in the figure, the windings 3 and 4 are connected in like sense, but the windings 30 and 40 are connected in opposition.

The winding 5 is energized with rectified current from a rectifier 16 supplied from the source 8 through a reactor 17. I also include in series with the winding 5 a fixed resistor 18. As indicated in the drawings the relative polarity of the windings 3 and 5 should be such that the magnetomotive forces due to these windings are in opposition.

Pulsating uni-directional power output may be withdrawn from either or both of the circuits including the resistances 11, 110, which latter resistances may represent output circuits or work devices. For example 110 may comprise the coil of a solenoid operated ratchet mechanism such as I have shown in Fig. 6. Such an arrangement is especially suitable for actuating "slow motion" display devices.

Figure 3:
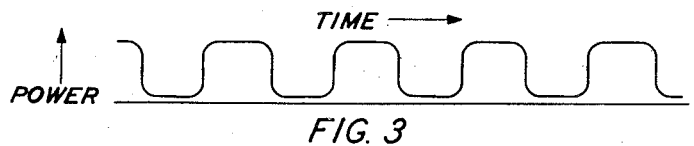
Figs. 3, 4 and 5 are time curves showing types of electrical pulsations illustrating the operation of my invention.
Figure 4:
Figure 5:
Figure 7:
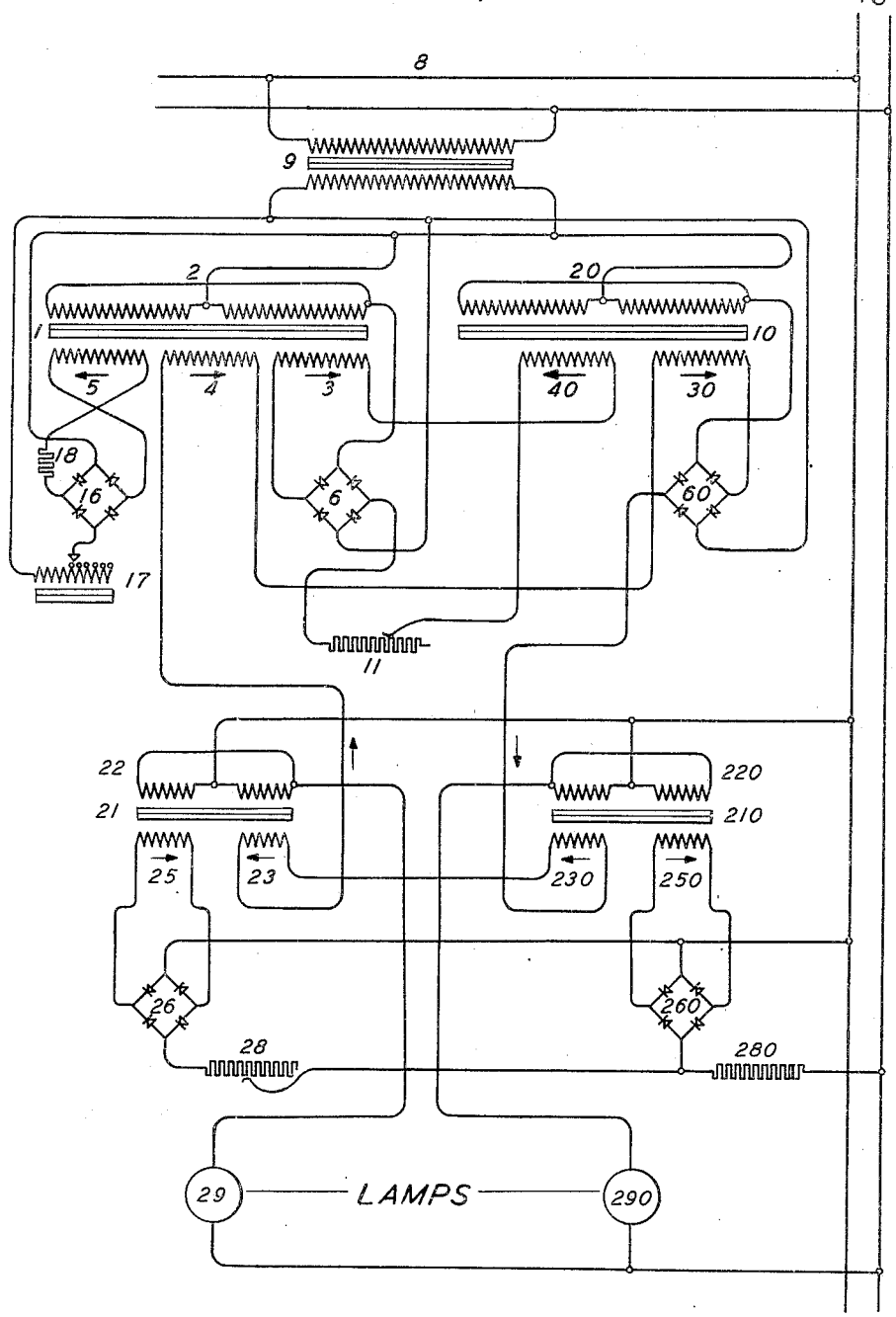
Fig. 7 is an electric circuit diagram representing a modification of my invention for operating a railroad grade crossing warning signal.

The reactor 17, may conveniently be provided with a number of taps as shown. The frequency and characteristics of the pulsations may be adjusted by controlling the energization of the rectifier 16 by means of these taps, and also by varying the resistance values of 11 and/or 110. Further control of the frequency can be effected by varying the alternating current voltage applied to the circuit by means of the transformer tap-switch 7. By a suitable choice of constants pulsation characteristics similar to those graphically indicated in Fig. 3 may be produced, the alternate periods of maximum and minimum power being of equal length and of relative magnitude of the order indicated in the curve of Fig. 3. By varying the relative adjustments of 17, 11, and 110 charteristics similar to those indicated in Fig. 4 may be provided, the period of minimum power being longer than the period of maximum power. By further varying the adjustment of 17, 11, and 110 the opposite result may be brought about as illustrated in Fig. 5, long periods of maximum power alternating with brief periods of minimum power.

I have further found that it is an advantage, if the source of alternating current power 8 is not maintained at a constant value, to provide the reactor 17 with a core having no air gap and to operate this core so that it is slightly saturated at the normal voltage of 8, to the end that variation in the energization of 16 shall be caused to be more than proportional to the voltage variation of 8. If the reactor 17 has linear characteristics I have found that substantial variation in the voltage of 8 causes variations in the frequency and characteristics of the pulsation. By providing a reactor 17 having non-linear characteristics as above specified I have found that fluctuation in the voltage of 8 of a considerable extent may take place without substantial variation in the frequency of pulsation.

I have shown also in Fig. 1 a winding 50 situated on the second saturating reactor and duplicating the winding 5. The presence of this winding forms no part of the connections necessary to set up and maintain continued pulsations and this winding may be omitted if desired. However, in manufacture it may be convenient to make the second reactor an exact duplicate of the first one. The winding 50 may usefully be employed as a control winding by means of which, without disconnecting the complete system from the power supply 8, the pulsations may be caused to commence or to be terminated at will. All adjustments having been made so that continuous pulsations take place, the energization of winding 50 to a very small extent, from any convenient source, will stop oscillation completely. As soon as this control excitation, applied to the winding 50, is withdrawn, pulsations will recommence. I show in Fig. 1 a source 12 by means of which control current for this purpose may be supplied to winding 50 through a high resistance 13 and control switch 14.

In order better to illustrate the action of this circuit I give below some typical numerical values taken from a practical embodiment of my invention which I have constructed and tested. It should, however, be clearly understood that my invention may be carried into effect on any desired scale of magnitude and may be modified in any manner conformable with the purpose and application for which it is to be employed. I am therefore in no way to be limited by the following data which is included only for the purpose of facilitating the practice and understanding of my invention.

In the apparatus referred to the cores 1, 10, consisted of approximately one half inch stacking of silicon steel laminations of the proportions shown in Fig. 2 and having overall dimensions approximately 2¾" x 2¾". Each section of the winding 2 consisted of 750 turns, windings 3, 4, and 5 having 700, 300, and 1500 turns respectively. These windings are suitable for operating the circuit from a voltage of 15 volts, 60 cycles, provided by transformer 9. When the current in winding 5 is adjusted to a value which may lie between 30 and 40 milliamps the current in 110, which may have a resistance of the order of 10 ohms, pulsates with minimum current values approximately 40 milliamps and maximum current values somewhat exceeding 100 milliamps.

With these circuit constants the pulsation frequency is of the order of 60 pulsations per minute.

I show in Fig. 6 connections, based upon the circuit of Fig. 1, for causing a pair of lamps to be flashed alternately after the manner in which red warning signal lights are operated in connection with grade crossings.

In the upper portion of Fig. 6 I show an arrangement substantially identical with Fig. 1, the control winding 50 being omitted. In the lower portion of Fig. 6 I show two further saturating reactors, having cores 21, 210, alternating current windings 22, 220, direct curent windings 23, 230, and 25, 250.

The function of these latter two saturating reactors is to amplify the pulsations received from the circuit of Fig. 1 so as to increase the power level to that necessary to energize signal lamps 29, 290, the connections being similar to the magnetic amplifying arrangements described in my Patent No. 2,027,311. The windings 23, 230 comprise the input windings. The windings 25, 250 are the compensating windings and serve a purpose similar to that of the winding 25 in Patent No. 2,027,311.

The input windings 23, 230 are energized as shown from the output of rectifier 60 in series with windings 4, 30. The input windings therefore take the place of the resistance 110.

It will be noted on referring to Fig. 6 that the winding 25 is connected in opposition to that of 23 in acordance with the method of connection described in Patent No. 2,027,311. By means of the resistance 28 the current in 25 is adjusted so as to produce excitation equal and opposite that produced in winding 23 during the minimum current periods of the pulsations. There will accordingly be no resultant saturating excitation applied to the core 21 during the minimum current periods. Saturation will be applied to 21, and the lamp 29 illuminated, during the maximum current periods of the pulsations.

It is desired to cause the lamp 290 to flash alternately with 29, rather than in unison; therefore the excitation of the winding 250 should be adjusted differently to that of 25. The resistance 280 should be set so as to give a current in 250 substantially higher than the current in 25. The excitation set up by the winding 250, opposite in sense to that of 230, should be equal to the ampere turns produced by 230 during the maximum current periods of the oscillation. The core 210 therefore receives zero direct current saturating ampere turns during the maximum current periods. Saturating excitation is applied to 110 and the lamp 290 illuminated only during the minimum current periods, the excitation of 250 preponderating over that of 230. Thus the lamps 29 and 290 are caused to flash alternately.

Although I have chosen a particular embodiment of my invention for the purpose of explanation, many modifications thereof will be apparent to those skilled in the art to which it pertains. My invention therefore is not to be limited except insofar as is necessitated by the prior art and the spirit of the appended claims.

What I claim as new and desire to secure by Letter Patent of the United States is:

1. An electrical system comprising, an alternating current supply circuit, a work device, a first circuit including a saturable core device, a second circuit including a saturable core device, each of said saturable core devices having a reactance winding, a saturating winding, and means for causing said circuits to have a plurality of conditions of stability furnishing a plurality of different current values in said reactance winding, together with means, inter-connecting said first circuit and said second circuit, for supplying said work device with energy pulsating at a frequency less than that of said supply circuit.

2. An electrical system comprising, an alternating current supply circuit, a work device, a first circuit including a saturable core device, a second circuit including a saturable core device, means for causing said circuits to have a plurality of conditions of stability furnishing a plurality of different current values, and means, inter-connecting said first circuit and said second circuit for supplying said work device with energy pulsating at a frequency less than that of said supply circuit.

3. An electrical system comprising, an alternating current supply circuit, a work device, a first circuit including a non-linear device, a second circuit including a non-linear device, and means for causing said circuits to have a plurality of conditions of stability furnishing a plurality of different current values, together with means inter-connecting said first circuit and said second circuit for supplying said work device with energy pulsating at a frequency less than that of said supply circuit.

4. An electrical system comprising, an alternating current supply circuit, a work device, a first circuit including a saturable core device, a second circuit including a saturable core device, each of said saturable core devices having a reactance winding, a saturating winding, means for causing each of said circuits to have a plurality of conditions of stability furnishing a plurality of different current values, control means for changing each of said circuits from one condition of stability to another condition of stability, means to energize the control means of said first circuit in accordance with the magnitude of a current in said second circuit whereby when said second circuit changes from one condition of stability to another said first circuit is caused to change condition, means to energize the control means of said second circuit in accordance with the magnitude of a current in said first circuit whereby when said first circuit changes from one condition of stability to another said second circuit is caused to change condition, and connections for supplying said work device with energy pulsating at a frequency less than that of said supply circuit.

5. An electrical system comprising an alternating current supply circuit, a load circuit, a saturable core device having a saturating winding and a reactance winding connected to control the energization of said load circuit from said supply circuit, means for energizing said saturating winding with a current variable in accordance with the magnetization of the core of said device, the ratio of the magnetomotive forces of said windings being such that, for given supply voltage, connections, and circuit constants, the system has a plurality of conditions of stability furnishing a plurality of different current values in said load circuit in accordance with a magnetic condition of the core of said device, control means for predetermining which of said conditions of stability shall obtain so as selectively to control the current in said load circuit, and means comprising a second similar saturable core device arrangement for energizing said control means so as to cause said system to oscillate between one of said magnetic conditions and another for supplying said load circuit with energy pulsating at a frequency less than that of said supply circuit.

6. An electrical system comprising, an alternating current supply circuit, a work device, a first circuit including a saturable core device, a second circuit including a saturable core device, and means for causing said circuits to have a plurality of conditions of stability furnishing a plurality of different current values, together with means, inter-connecting said first circuit and said second circuit, whereby when one of said circuits changes from one condition of stability to another the other of said circuits is caused to change condition, so as to supply said work device with energy pulsating at a frequency less than that of said supply circuit.

7. An electrical system comprising, an alternating current supply circuit, a work device, a first circuit including a saturable core device, a second circuit including a saturable core device, each of said saturable core devices having a reactance winding, a saturating winding, and means for causing said circuits to have a plurality of conditions of stability furnishing a plurality of different current values, together with means, inter-connecting said first circuit and said second circuit, whereby each of said circuits is caused to oscillate between one of said conditions of stability and another, and means for supplying said work device with energy pulsating at a frequency less than that of said supply circuit.

8. An electrical system comprising, an alternating current supply circuit, a load circuit, a saturable core device having a saturating winding and a reactance winding connected to control the energization of said load circuit from said supply circuit, means for energizing said saturating winding with a current variable in accordance with the magnetization of the core of said device, the ratio of the magnetomotive forces of said windings being such that, for given supply voltage, connections, and circuits constants, the system has a plurality of conditions of stability furnishing a plurality of different current values in said load circuit in accordance with a magnetic condition of the core of said device, control means for predetermining which of said conditions of stability shall obtain so as selectively to control the current in said load circuit, and fluctuating means connected to energize said control means for causing said load circuit to be supplied with energy pulsating at a frequency less than that of said supply circuit.

9. An electrical system comprising, an alternating current supply circuit, a work device, a circuit including a non-linear device having characteristics such that for given supply voltage, connections, and circuit constants, the circuit has a plurality of conditions of stability furnishing a plurality of different current values in said work device, control means for predetermining which of said conditions of stability shall obtain so as selectively to control the current in said work device, and means comprising a second similar circuit connected to energize said control means for causing said work device to be supplied with energy pulsating at a frequency less than that of said supply circuit.

10. An electrical system comprising, an alternating current supply circuit, a work device, a circut including a non-linear device having characteristics such that for given supply voltage, connections, and circuit constants, the system has a plurality of conditions of stability furnishing a plurality of different current values in said load circuit, control means for predetermining which of said conditions of stability shall obtain so as selectively to control the current in said load circuit, and fluctuating means connected to energize said control means for causing said work device to be supplied with energy pulsating at a frequency less than that of said supply circuit.

11. An electrical system comprising, an alternating current supply circuit, a first load circuit, a saturable core device having a saturating winding and a reactance winding connected to control the energization of said load circuit from said supply circuit, means for energizing said saturating winding with a current variable in accordance with the magnetization of the core of said device, the ratio of the magnetomotive forces of said windings being such that, for given supply voltage, connections, and circuit constants, the system has a plurality of conditions of stability furnishing a plurality of different current values in said load circuit in accordance with a magnetic condition of the core of said device, control means for predetermining which of said conditions of stability shall obtain so as selectively to control the current in said load circuit, a second load circuit, a second saturable core device having a saturating winding and a reactance winding connected and energized in similar manner and having likewise a plurality of conditions of stability, together with a second control means, means for energizing the control means of said first saturable core device from the current in said second load circuit, and means for energizing the control means of said second saturable core device from said first load circuit, whereby the current in each of said load circuits is caused to oscillate between one condition of stability and another thereby producing in each load circuit energy fluctuating at a frequency less than that of said supply circuit.

12. An electrical system comprising, an alternating current supply circuit, a first load circuit, a first saturable core device having a direct current saturating winding and an alternating current winding connected to control the energization of said load circuit from said supply circuit, means for energizing said saturating winding with a direct current variable in accordance with the magnetization of the core of said device, the ratio of the magnetomotive forces of said windings being such that, for given supply voltage, connections, and circuit constants, the system has a plurality of conditions of stability furnishing a plurality of different current values in said load circuit in accordance with a residual magnetic condition of the core of said device, a control winding for modifying said residual magnetic condition so as to cause the system to change from one of said conditions of stability to another, a second load circuit, a second saturable core device having a second direct current saturating winding, a second alternating current winding, a second control winding, means connecting the control winding of said first saturable core device in series with the direct current saturating winding of said second saturable core device, means connecting the control winding of said second saturable core device in series with the direct current saturating winding of said first saturable core device so as to cause each of said saturable core devices continuously to oscillate between one condition of stability and another whereby the current in each of said load circuits is caused to pulsate at a frequency less than that of said supply circuit.

13. An electrical system comprising, an alternating current supply circuit, a first load circuit, a first saturable core device having a first direct current saturating winding, a second direct current saturating winding, and an alternating current winding connected to control the energization of said load circuit from said supply circuit, means for energizing said first saturating winding with a direct current variable in accordance with the magnetization of the core of said device, means for energizing said second saturating winding with a uni-directional current of substantially constant value, the ratio of the magneto-motive forces of said windings being such that, for given supply voltage, connections, and circuit constants, the system has a plurality of conditions of stability furnishing a plurality of different current values in said load circuit in accordance with a residual magnetic condition of the core of said device, a control winding for modifying said residual magnetic condition so as to cause the control system to change from one of said conditions of stability to another, a second load circuit, a second saturable core device having a direct current saturating winding, an alternating current winding, and a control winding, means connecting the control winding of said first saturable core device in series with the direct current saturating winding of said second saturable core device, means connecting the control winding of said second saturable core device in series with the first mentioned direct current saturating winding of said first saturable core device whereby each of said saturable core devices is caused continuously to oscillate between one condition of stability and another so as to cause the current in each of said load circuits to pulsate at a frequency less than that of said supply circuit.

14. In combination, an alternating current supply circuit, a first saturable core device having an alternating current winding and three direct current windings, a second saturable core device having an alternating current winding and two direct current windings, a first rectifier connected to a D. C. winding on said first saturable core device, a second rectifier connected to a D. C. winding on said first saturable core device and a D. C. winding on said second saturable core device, a third rectifier connected to another direct current winding on said first saturable core device and another direct current minding on said second saturable core device, an output circuit and means for supplying to said output circuit energy pulsating at a frequency less than that of said supply circuit.

15. In combination, an alternating current supply circuit, a first saturable core device having a winding connected to said supply circuit and three direct current windings, a second saturable core device having a winding connected to said supply circuit and two direct current windings, a first rectifier connected to said supply circuit and to a D. C. winding on said first saturable core device, a second rectifier connected to said supply circuit and to a D. C. winding on said first saturable core device and a D. C. winding on said second saturable core device, a third rectifier connected to said supply circuit and to another direct current winding on said first saturable core device and another direct current winding on said second saturable core device, an output circuit, and means for supplying to said output circuit energy pulsating at a frequency less than that of said supply circuit.

16. In combination, an alternating current supply circuit, a first saturable core device having an alternating current winding and three direct current windings, a second saturable core device having an alternating current winding and two direct current windings, three rectifiers, means connecting one of said rectifiers to said supply circuit and to one of the direct current windings on said first device, means connecting each of said other rectifiers to said supply circuit in series with one of said alternating current windings, means inter-connecting other direct current windings on said first and said second device with said other rectifiers, an output circuit, and means for supplying to said output circuit energy pulsating at a frequency less than that of said supply circuit.

17. An electrical system comprising, an alternating current supply circuit, a work device, a first circuit including a non-linear device, a second circuit including a non-linear device, means for causing said circuits to have a plurality of conditions of stability furnishing a plurality of different current values, means inter-connecting said first circuit and said second circuit for supplying said work device with energy pulsating at a frequency less than that of said supply circuit, and means whereby, at one time, said energy pulsations may be inhibited and, at another time, may be permitted.

18. An electrical system comprising, an alternating current supply circuit, a work device, a first circuit including a non-linear device, a second circuit including a non-linear device, means for causing said circuits to have a plurality of conditions of stability furnishing a plurality of different current values, means into-connecting said first circuit and said second circuit for supplying said work device with energy pulsating at a frequency less than that of said supply circuit, and means for varying a characteristic of the pulsations of said energy.

ALAN S. FITZ GERALD.